April 19, 1966     J. F. ORZECHOWSKI     3,246,935
CLUTCH BEARING
Filed Jan. 27, 1964
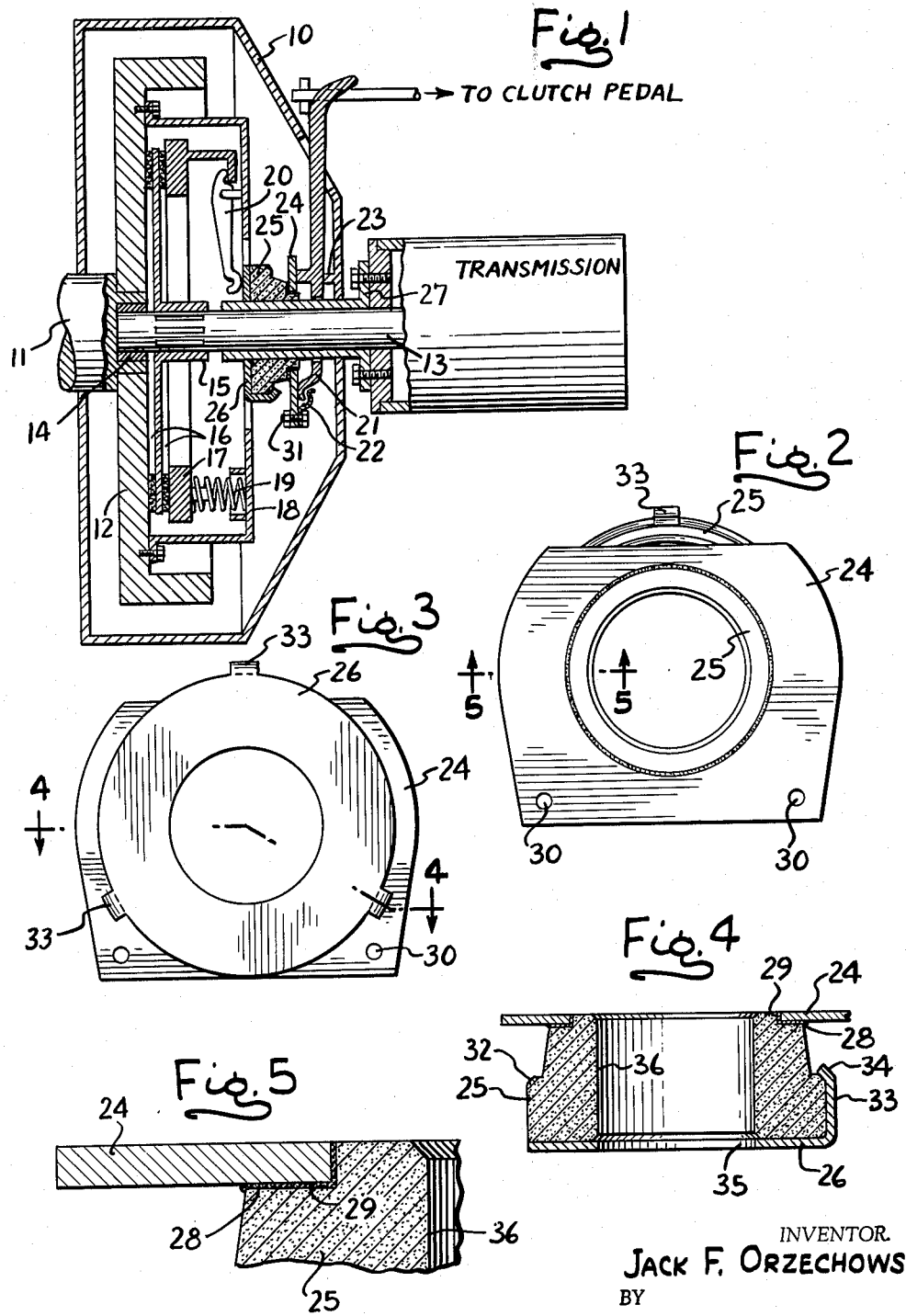
INVENTOR.
JACK F. ORZECHOWSKI
BY
Gary, Parker, Juettner & Cullinan
ATTYS.

United States Patent Office 3,246,935
Patented Apr. 19, 1966

3,246,935
CLUTCH BEARING
Jack F. Orzechowski, Stratford, Conn., assignor to Raybestos-Manhattan, Inc., Passaic, N.J., a corporation of New Jersey
Filed Jan. 27, 1964, Ser. No. 340,338
7 Claims. (Cl. 308—135)

This invention relates to a bearing and more particularly a clutch release bearing unit and to a low coefficient of friction composition component therefor.

The present invention is particularly adapted for use as a clutch release bearing unit adapted for motor vehicles such as for example a Ford automobile.

Due to the novel construction of the bearing unit of the present invention and its component low friction bearing material, no lubrication is required, as distinguished from prior use of ball bearing and carrier assemblies which required lubrication of both the ball bearing and the cast iron carrier which slides over the stationary supporting sleeve for the unit.

During heavy driving conditions, grease is melted from the ball bearings causing them to run non-lubricated which results in galling and seizing of the bearing requiring replacement. In addition, the melted grease splashes onto the clutch facings causing clutch slippage and facing replacement. Also, loss of lubricant from an oil retainer in the cast iron carrier employed in the prior assemblies causes the assembly to hang up on the supporting sleeve component with resultant clutch slippage and partial pedal return.

As distinguished from the foregoing, the present invention replaces requirement for ball bearings and also slides on the supporting sleeve or shaft without lubrication, which also results in less pedal effort to disengage the clutch. Moreover, with the present construction there is appreciable weight reduction as contrasted with ball bearing assemblies and fewer parts are used, resulting in economical advantages.

The bearing composition of the present invention is further characterized by inclusion of rubber material acting as a vibration dampener, permitting successful operation noiselessly at temperatures as low as −60° F., where normal carbon type bearings were prone to noise.

The normal carbon type bearings have been generally encased in a stamped or drawn cup or cast iron enclosure. As distinguished from this, the structure and arrangement of the present invention permits attachment of the bearing material to a flat blanked and pierced piece of metal using thermosetting cements of either hot or cold setting types. Moreover, it interposes a layer of vibration absorbent material and prevents noise propagation from the rotating rub plate to the possibly resonant backing plate which would act as an amplifier.

The bearing composition of the present invention also permits incorporation of various percentages of friction decreasing adjuvants permitting coefficients of friction as low as .03 under certain conditions of load, speed and temperature.

Other objects and advantages of the present invention relate to details of construction, arrangement of parts, and economies thereof, as will be apparent from the following specification and accompanying drawings, wherein:

FIG. 1 is a sectional view of a conventional clutch such as used in automobiles showing a clutch throw-out bearing assembly and employing the unit of the present invention.

FIG. 2 is an end view of the clutch release bearing unit of the present invention viewed from the end to which the supporting or steel backing plate is secured.

FIG. 3 is an opposed end view of the unit shown in FIG. 2, showing the rub plate.

FIG. 4 is a section on the line 4—4 of FIG. 3.

FIG. 5 is a fragmentary section taken on the line 5—5 of FIG. 2.

Referring to the drawings, and particularly FIG. 1, the reference numeral 10 indicates a clutch housing cover plate which keeps the clutch airtight and free of foreign material. Reference numeral 11 indicates the engine crankshaft to which a flywheel 12 is attached. Splined drive shaft 13 is piloted by bearing 14 in crankshaft 11. Mounted on drive shaft 13 is a mating splined clutch plate 15 which carries two clutch facing friction material rings 16, 16. 17 is a pressure plate mounted in a clutch housing assembly 18, said assembly being activated by coil springs 19 when the clutch is engaged and fingers 20 (only one being shown) when the clutch is disengaged.

In normal operation, with the clutch fully engaged, the following components are rotating: crankshaft 11, pilot bearing 14, flywheel 12, clutch plate 15, friction facings 16, pressure plate 17, springs 19, clutch housing 18, clutch fingers 20 and driveshaft 13.

When it is necessary to shift gears in transmission, drive shaft 13 must be deenergized and this is done in the following manner. The operator depresses the clutch pedal causing clutch release lever 21 held by spring clip 22 to move in the direction of the arrow and pivoted on fulcrum point 23. This movement causes backing plate 24, bearing material composition 25 and rub plate 26 to move to the left on stationary sleeve 27 and to approach and engage rotating fingers 20. Stationary rub plate 26 begins to rotate on bearing material 25 with slippage at the interface of 20 and 26, until rub plate 26 becomes synchronous with the fingers 20, at which time all slippage is at the interface of bearing composition component 25 and rub plate 26. Fingers 20 are thus moved to the left compressing spring 19 and releasing pressure on clutch facings 16, thus deenergizing drive shaft 13.

When the clutch pedal is released to normal, parts 24, 25, 26 and 22 move to the right and fingers 20 are disengaged, whereupon rub plate 26 becomes stationary and the clutch is again engaged with the drive shaft energized.

As shown in FIG. 4, the bearing composition component 25 is formed with an axial bore 36 for seating on stationary sleeve 27 and at one end is formed with an annular recess providing a shoulder 28 on which the backing and mounting plate 24 is seated and adhesively secured in place by means of the adhesive 29, which may be a cold or hot setting phenol formaldehyde or epoxy resin binder of the class such as for example that used in bonding brake linings and brake shoes. This provides a firm bond but which yet withal due to its non-metallic character provides an interposed layer of vibration absorbant and prevents noise propagation for rotating rub plate 26 to the backing plate 24 which might act as an amplifier. If desired rivets and screws can be additionally employed for added security while being rendered vibration proof. The backing plate 24 is provided with apertures 30 to permit engagement thereto by means of the clips 22 as at 31.

The opposed end of the bearing composition unit 25 is of enlarged or bulbous character providing an annular shoulder 32 about which there is engaged the arms 33 extending integrally from the rub plate 26 by being turned about the shoulder as at 34 to hold the rub plate rotatably engaged with the bearing component 25, this rub plate 26 being of course formed with an annular opening 35 aligned with the axial bore 36 in the bearing element 25.

For purposes of illustration and not limitation, the following is a typical composition composed in major amount by weight of graphite and including thermosetting resinous binder together with a minor amount by weight of rubber and curing agent therefor, the rubber serving as a vibration dampener in the composition:

|  | Percent dry volume | Percent wet weight |
|---|---|---|
| Pulverized asbestos fiber | 7.00 | 8.59 |
| 75% solids aqueous thermosetting phenol formaldehyde resin | 26.20 | 22.40 |
| Butadiene-styrene copolymer rubber crumb | 14.80 | 6.70 |
| Sulfur | 1.70 | 1.62 |
| Graphite | 50.30 | 57.06 |
| Solvent |  | 3.63 |
|  | 100.00 | 100.00 |

The foregoing composition is molded and cured to a maximum temperature of 450° F. to cure the binder and to eliminate solvent and aqueous content and to prevent subsequent shrinkage. The theoretical dry specific gravity of the foregoing composition is 1.89.

The cured component 25 is bonded to a clean, sandblasted backing plate 24 with suitable heat resistant adhesive such as for example phenol formaldehyde resin or epoxy resin or combinations thereof.

In lieu of the phenol formaldehyde resin in the above formula it will be understood that other thermosetting resins such as cashew nut shell oil modified phenol formaldehyde resin, epoxy resins and the like may be employed.

It will also be understood that various minor percentages of friction decreasing agents may also be included in the foregoing composition such as tetrafluoroethylene (Teflon), high-viscosity lubricating oils and greases such as trimethylolpropane triester or silicone; stearates, stearin; disulfides of molybdenum and tungsten, high melting point waxes and alloyed lead, tin or copper bearing metal powders, the foregoing additives permitting reduction of coefficient of friction as previously indicated to as low as .03.

Although I have shown and described the preferred embodiment of my invention it will be understood by those skilled in the art that changes may be made in the details thereof without departing from its scope as comprehended by the following claims.

I claim:

1. A clutch release bearing unit comprising a low coefficient of friction composition bearing element formed with a cylindrical bore, a first shoulder formed on said element adjacent one end thereof about said bore, a metal mounting plate seated on said shoulder and fixedly secured thereto, a cylindrical protuberance on the opposed end of said element defined by an annular shoulder adjacent the first shoulder, a metallic rub plate disposed on said opposed end formed with annular opening aligned with said bore, and a plurality of peripheral tabs integral with said rub plate and engaged about said second shoulder retaining said rub plate in rotatable engagement with said bearing element.

2. A clutch release bearing unit comprising a low coefficient of friction composition bearing element formed with a cylindrical bore, a first annular shoulder formed on the outer periphery of said element adjacent one end thereof about said bore, a metal mounting plate seated on said shoulder and adhesively secured thereto, a cylindrical protuberance on the opposed end of said element defined by a second annular shoulder, a metallic rub plate disposed on said opposed end formed with annular opening aligned with said bore, and a plurality of peripheral tabs integral with said rub plate and engaged about said second shoulder retaining said rub plate in rotatable engagement with said bearing elements.

3. A clutch release bearing unit comprising a low coefficient of friction composition bearing element composed in major amount by weight of graphite formed with a cylindrical bore, a first shoulder formed on said element adjacent one end thereof about said bore, a metal mounting plate seated on said shoulder and fixedly adhesively secured thereto, a cylindrical protuberance on the opposed end of said element defined by an annular shoulder adjacent the first shoulder, a metallic rub plate disposed on said opposed end formed with annular opening aligned with said bore, and a plurality of peripheral tabs integral with said rub plate and engaged about said second shoulder retaining said rub plate in rotatable engagement with said bearing element.

4. A clutch release bearing unit comprising a low coefficient of friction composition bearing element formed with a cylindrical bore and composed in major amount by weight of graphite and including hardened resinous binder, and a minor amount by weight of rubber, a first shoulder formed on said element adjacent one end thereof about said bore, a metal mounting plate seated on said shoulder and adhesively secured thereto, a cylindrical protuberance on the opposed end of said element defined by an annular shoulder adjacent the first shoulder, a metallic rub plate disposed on said opposed end formed with annular opening aligned with said bore, and a plurality of peripheral tabs integral with said rub plate and engaged about said second shoulder retaining said rub plate in rotatable engagement with said bearing element.

5. A clutch release bearing unit comprising a low coefficient of friction composition bearing element formed with a cylindrical bore and composed in major amount by weight of graphite, including hardened resinous binder and minor amounts by weight of rubber vibration dampener, friction reducing lubricant material, and reinforcing fibers, a first shoulder formed on said element adjacent one end thereof about said bore, a metal mounting plate seated on said shoulder and adhesively secured thereto, a cylindrical protuberance on the opposed end of said element defined by an annular shoulder adjacent the first shoulder, a metallic rub plate disposed on said opposed end formed with annular opening aligned with said bore, and a plurality of peripheral tabs integral with said rub plate and engaged about said second shoulder retaining said rub plate in rotatable engagement with said bearing element.

6. A bearing element composed in major amount by weight of graphite and including hardened resinous binder, and a minor amount of weight of rubber.

7. A bearing element composed in major amount by weight of graphite, including hardened resinous binder and minor amounts by weight of rubber vibration dampener, friction reducing lubricant material, and reinforcing fibers.

References Cited by the Examiner

UNITED STATES PATENTS 1,780,749  11/1930  Frehse et al. _____ 192—98

FOREIGN PATENTS 437,052  10/1935  Great Britain.

DON A. WAITE, *Primary Examiner.*